(12) United States Patent
Sakai et al.

(10) Patent No.: US 7,746,578 B2
(45) Date of Patent: Jun. 29, 2010

(54) LENS ASSEMBLY AND IMAGING DEVICE

(75) Inventors: Yuya Sakai, Saitama (JP); Mitsuhiro Ohno, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 0 days.

(21) Appl. No.: 12/404,017

(22) Filed: Mar. 13, 2009

(65) Prior Publication Data
US 2009/0244726 A1    Oct. 1, 2009

(30) Foreign Application Priority Data
Mar. 28, 2008    (JP)    ............ P2008-088528

(51) Int. Cl.
G02B 7/02    (2006.01)
(52) U.S. Cl. .................. 359/811; 359/819
(58) Field of Classification Search .......... 359/811–818
See application file for complete search history.

(56) References Cited

U.S. PATENT DOCUMENTS 6,424,473 B1 *    7/2002    Nakane et al. ............ 359/827
7,576,930 B2 *    8/2009    Yu ............................ 359/821
2007/0191209 A1    8/2007    Hyuga et al.

FOREIGN PATENT DOCUMENTS

| JP | 2001-27723 A | 1/2001 |
|---|---|---|
| JP | 2006-284991 A | 10/2006 |
| JP | 2006-292927 A | 10/2006 |
| JP | 2007-199235 * | 8/2007 |
| JP | 2007-238430 A | 9/2007 |
| JP | 2007-279557 A | 10/2007 |

* cited by examiner

*Primary Examiner*—Timothy J Thompson
(74) *Attorney, Agent, or Firm*—Birch, Stewart, Kolasch & Birch, LLP

(57) ABSTRACT

A lens assembly is provided and includes: a lens frame; and a lens frame having a hollow part into which the lens is inserted. The lens frame has a bonding hole into which an adhesive agent is injected for bonding and fixing to the lens frame the lens inserted into the lens frame and which passes through an outer wall of the lens frame and an inner wall of the hollow part.

15 Claims, 2 Drawing Sheets

LENS ASSEMBLY AND IMAGING DEVICE

This application is based on and claims priority under 35 U.S.C §119 from Japanese Patent Application No. 2008-088528, filed on Mar. 28, 2008, the entire disclosure of which is herein incorporated by reference.

BACKGROUND OF THE INVENTION

1. Field of the Invention

The present invention relates to a lens assembly in which a lens is inserted into a lens frame, and an imaging device having the lens assembly.

2. Description of Related Art

Recently, cameras for watching places of the dead angle for drivers have been equipped with motor vehicles. Further, in department stores or mansions, many fixed-point cameras for monitoring have been arranged.

Since these cameras are frequently provided outside, such a strict waterproof performance or a dustproof function as to withstand an outdoor environment are required. Accordingly, a certain lens assembly applied to such a camera has a structure that space rings for determining spaces between a plurality of lenses are inserted in order into a hollow part of a lens frame and an opening located in an object side is finally sealed by the lens located at a part nearest to the object side so that the water proof performance or the dustproof performance can be obtained.

However, in such a structure, when the lenses are bonded and fixed, since adhesive agent applying parts as described in JP-A-2001-027723 need to be provided in the lens frame, a mechanism of the lens frame is complicated and enlarged. Further, in the structure disclosed in JP-A-2001-027723, since adhesive layers for bonding the lenses to the lens frame are not seen from a front surface, whether or not an adhesive agent effectively infiltrates into the adhesive layers cannot be recognized. If the adhesive agent does not infiltrate into the adhesive layers, when the lens assembly is used to be mounted on a vehicle, there is a fear that the lenses may move due to the vibration of the motor vehicle or the optical axes of the lenses adjusted during an assembly may be shifted so that an initial performance is not satisfied.

SUMMARY OF THE INVENTION

An object of an illustrative, non-limiting embodiment of the present invention is to provide a compact lens assembly in which the bonded state of a lens in a lens frame to the lens frame can be recognized from an external part and an imaging device having the lens assembly.

According to an aspect of the invention, there is provided a lens assembly including:

a lens frame; and a lens frame having a hollow part into which the lens is inserted, wherein the lens frame has a bonding hole into which an adhesive agent is injected for bonding and fixing to the lens frame the lens inserted into the lens frame and which passes through an outer wall of the lens frame and an inner wall of the hollow part.

According to the lens assembly, after the lens is inserted into the lens frame, the adhesive agent is injected through the boding hole to fix the lens in the lens frame to prescribed positions.

At this time, since an operator of an assembly can apply the adhesive agent by recognizing the outer peripheral surface of the lens in the lens frame through openings, the lens can be assuredly bonded and fixed to the lens frame.

Therefore, a high adhesive strength is obtained between the lens and the lens frame. Thus, when a lens assembly of the present invention is mounted on, for instance, a motor vehicle, the lens is hardly detached from the lens frame due to a vibration.

Here, in the bonding hole, an opening opened on the outer wall may have an area larger than that of an opening opened on the hollow part.

Thus, when the opening of the bonding hole opened on the outer wall is larger than the opening opened on the hollow part, the adhesive agent can be easily supplied through the opening opened on the outer wall. Further, when a quantity of the adhesive agent supplied from the opening opened on the outer wall is increased, since the opening having a larger area on the outer wall side can receive the surplus adhesive agent, the adhesive agent is prevented from flowing out to the outer wall of the lens frame.

A plurality of bonding holes may be provided in the directions of turning round the lens inserted into the lens frame.

In such a way, when the outer periphery of the lens is bonded and fixed to the lens frame through the plurality of bonding holes, the lens is more assuredly bonded to the lens frame and a higher adhesive strength can be obtained.

An imaging device according to an aspect of the invention includes: the lens assembly and an imaging element.

According to the imaging device, the imaging device having an earthquake-proof performance is realized.

BRIEF DESCRIPTION OF THE DRAWINGS

The features of the invention will appear more fully upon consideration of the exemplary embodiment of the invention, which are schematically set forth in the drawings, in which.

DETAILED DESCRIPTION OF THE EXEMPLARY EMBODIMENTS

According to an exemplary embodiment of the invention, it is possible to provide a compact lens assembly in which the bonded state of the lens to a lens frame can be recognized from an external part, and to provide an imaging device having the lens assembly.

Now, an exemplary embodiment of the present invention will be described below.

Figure 1:
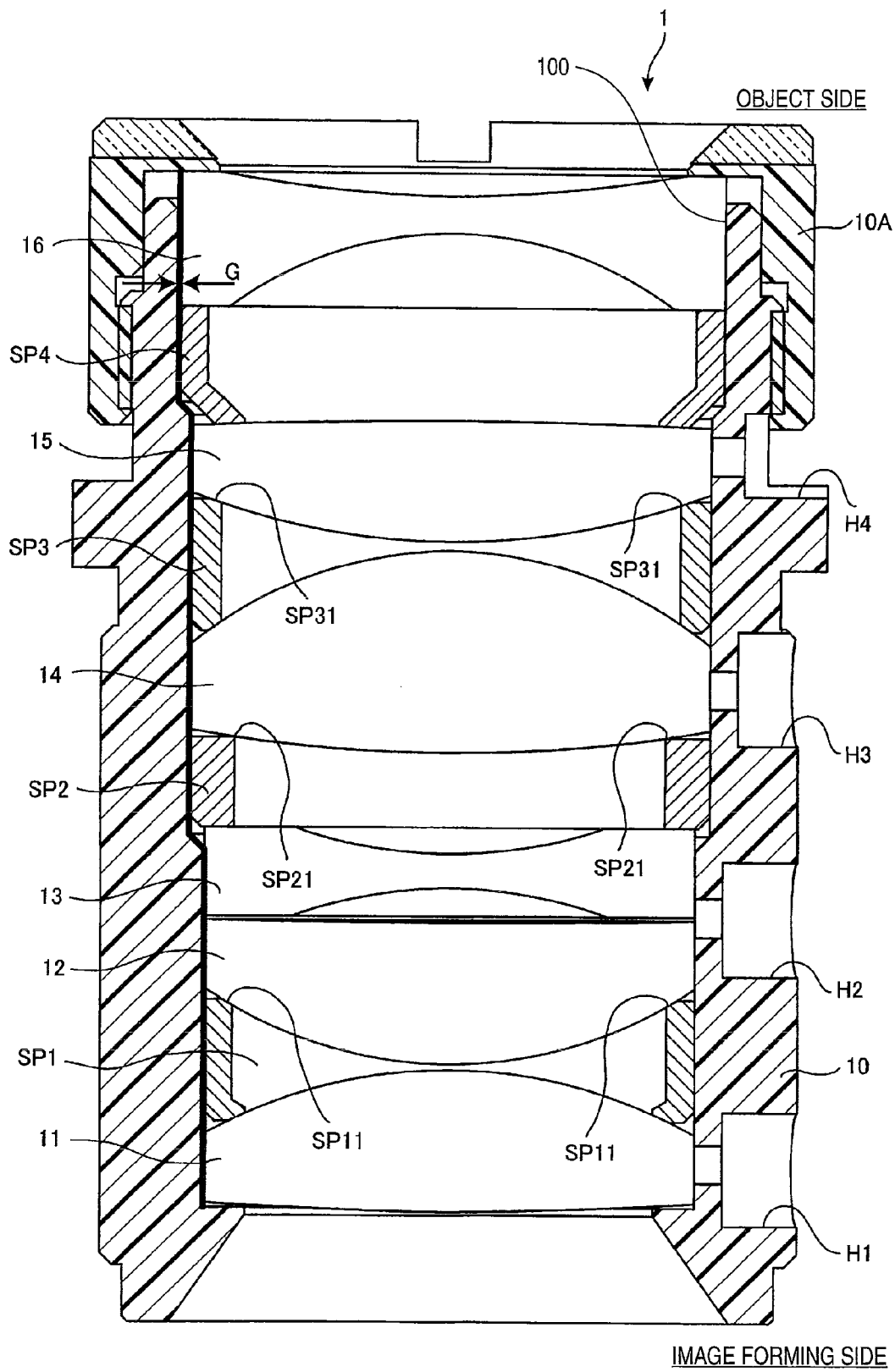
FIG. 1 is a diagram showing a cross section of a lens assembly according to an exemplary embodiment of the present invention.

FIG. 1 is a diagram showing a surface of a lens assembly 1 according to an exemplary embodiment of the present invention, which is taken along an optical axis of a lens and seen from a side part. An upper part of FIG. 1 is an object side and a lower part of FIG. 1 is an image forming side.

FIG. 1 shows a lens assembly 1 provided with a lens frame 10 having a hollow part 100 into which space rings SP1 to SP4 for determining spaces between lenses and a plurality of lenses 11 to 16 are inserted in prescribed order. In FIG. 1, six lenses including two concave lenses 13 and 16 and four convex lenses 11, 12, 14 and 15 are combined together to form lenses in the present invention.

As shown in FIG. 1, after the lenses 11 to 16 and the space rings SP1 to SP 4 are inserted into the lens frame 10, an adhesive agent is injected from bonding holes H1 to H4 passing through the outer wall of the lens frame and the inner wall of the hollow part so as to bond and fix the lenses 11 to 15 in the lens frame 10 to the lens frame. However, in the object side of the lens frame 10, a cover part 10A forming a part of the lens frame 10 is provided. After the plurality of lenses 11 to 16 are inserted into the lens frame 10, since an opening of the object side is covered with the cover 10A to seal the opening, a part of the object side that is located in the outer peripheral surface of the lens 16 is not provided with the bonding hole.

In FIG. 1, the one bonding hole as each of H1 to H4 is shown, however, actually, three bonding holes are respectively provided in the directions of turning round the each lens inserted into the lens frame 10. The adhesive agent is injected through each of the three bonding holes to firmly bond each of the lenses 11 to 15 to the lens frame 10.

Further, in the bonding holes H1 to H4 shown in FIG. 1, openings opened on the outer wall have larger areas than those of openings opened on the hollow part, and the openings opened in the hollow part 100 are respectively located in the outer peripheral surfaces of the lenses 11 to 15. Accordingly, the adhesive agent is injected by recognizing the outer peripheral surfaces of the lenses through larger openings on the outer wall side so that the lenses 11, 12, 13, 14 and 15 can be effectively assuredly bonded to the lens frame 10. Further, when the adhesive agent is erroneously excessively injected due to an easiness of injection, the excessive quantity of adhesive agent can be effectively received by the opening parts having larger areas in the outer wall side to prevent the flow-out of the adhesive agent to an external part.

In such a way, when the adhesive agent is injected through the bonding holes H1 to H4 by recognizing the outer peripheral surfaces of the lenses from the external part so as to bond and fix the lenses 11 to 15 to the lens frame 10, a high adhesive strength is obtained. Thus, even when the lens assembly 1 shown in FIG. 1 is mounted on a motor vehicle, an inconvenience hardly arises that the lenses 11 to 16 are detached to fall from the lens frame 10 due to a vibration.

Here, in the lens assembly of this embodiment, since the eccentricities of the plurality of the lenses in the lens frame 10 can be adjusted at a time by a simple structure in which receiving parts SP11, SP 21 and SP31 for receiving the convex surfaces of the lenses 12, 14 and 15 are provided in the space rings SP1 to SP3 to simplify an assembling operation of the lens assembly 1, an assembling method thereof will be briefly described below.

By referring to FIG. 1, the assembling method of the lens assembly 1 will be described below.

Initially, in a first inserting step, the lenses 11 to 16 are inserted into the hollow part 100 of the lens frame 10 in prescribed order. In a next vibration step, the lens frame 10 into which the lenses 11 to 16 are inserted is positioned with the optical axes of the lenses extending vertically, and a vibration in any of upward, downward, rightward and leftward directions is applied to the lens frame 10 to adjust the eccentricity so that the optical axes of the lenses are respectively aligned.

In this embodiment, the space ring SP1, the space ring SP2 and the space ring SP3 are provided with the receiving parts SP11, SP21 and SP31 for receiving the peripheral edges of the lower surfaces of the lenses located just above them when the lens frame 10 is positioned with the optical axes extending vertically, the surfaces of the lenses 12, 14 and 15 that come into contact with the receiving parts SP11, SP21 and SP31 are made to be convex surfaces, a backlash G is formed between the hollow part 100 of the lens frame 10 and the outer peripheral surfaces of the lenses 11 to 16 respectively, and then, the vibration is applied to the lens frame 10 so that the eccentricities of the optical axes of the plurality of the lenses can be respectively adjusted at a time.

In this embodiment, by considering that the lenses having diameters of φ8 to φ10 (mm) are used, the backlash G of 0.002 to 0.030 mm is provided.

This structure uses a property that when, the vibration is applied to the lens frame, the positions of the convex surfaces of the lenses 12, 14, and 15 received by the receiving parts SP11, SP21 and SP31 of the space rings SP1, SP2 and SP3 converge to prescribed positions of the peripheral edges of the outer peripheries of the convex lenses in accordance with the centers of gravity of the lenses. That is, when the lens frame 10 is positioned with the optical axes extending vertically and the vibration in any of the upward, downward, rightward and leftward directions to the lens frame 10, the positions of the convex surfaces of the lenses received by the receiving parts of the space rings SP1, SP2 and SP3 converge to prescribed positions and do not move. In such a way, when the positions of the convex lenses received by the receiving parts of the space rings converge to the prescribed positions and do not move, the optical axes of the lenses 12, 14 and 15 are aligned. Further, in other lenses 11, 13 and 16 continuously connected by the space rings SP1 to SP4, the optical axes are also aligned following the optical axes of the lenses 12, 14 and 15.

Thus, in this embodiment, after the vibration is applied to the lens frame shown in FIG. 1 in any of the upward, downward, rightward and leftward directions to align the optical axes of the lenses respectively in the lens frame, the adhesive agent is injected by recognizing the outer peripheral surfaces of the lenses from the bonding holes H1 to H4 shown in FIG. 1 to securely bond and fix the lenses respectively in the lens frame to the lens frame.

In such a way, an effect can be obtained that the assembling operation can be greatly easily carried out. Further, since a bonding work can be carried out by recognizing the outer peripheral surfaces of the lenses, the lenses can be effectively securely bonded and fixed to the lens frame. As a result, the lens assembly having a vibration-resistance can be constructed that can be mounted on a motor vehicle.

Finally, an example that the lens assembly is applied to a camera to be mounted on a vehicle will be described below.

Figure 2:
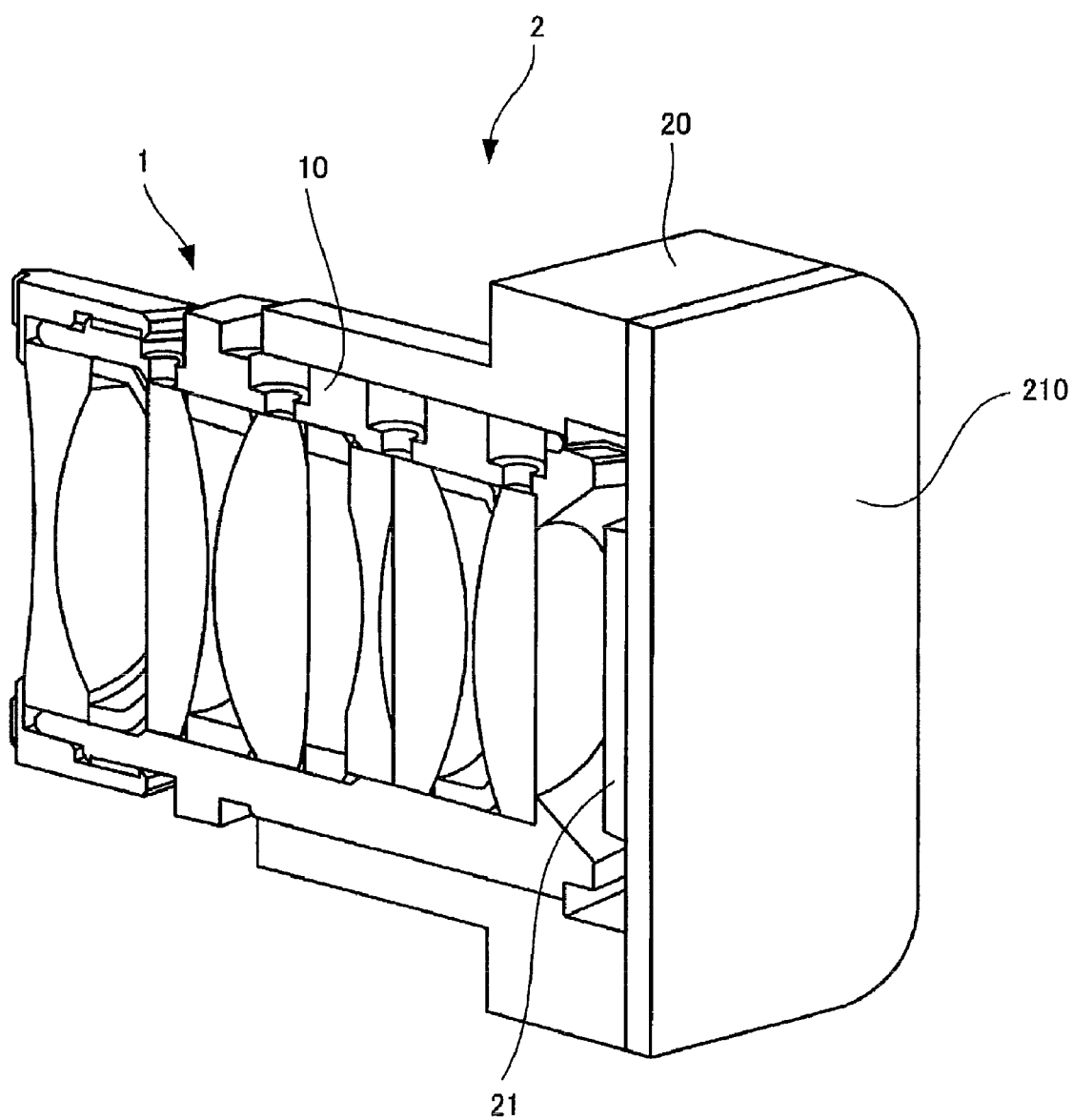
FIG. 2 is a diagram showing a camera including the lens assembly shown in FIG. 1.

FIG. 2 is a diagram showing a camera unit 2 having the lens assembly.

FIG. 2 is a diagram showing a surface of the camera unit 2 taken along an optical axis that is seen from an obliquely upper part.

The camera unit 2 shown in FIG. 2 includes the lens assembly 1 shown in FIG. 1, a camera main body frame 20 and an imaging element 21. The imaging element 21 is mounted on a base board 210 of the imaging element and stuck and fixed to the camera main body frame 20. On the outer peripheral surface of the lens frame 10 of the lens assembly 1 in FIG. 2 and the inner peripheral surface of the camera main body frame 20 respectively, screw parts are formed.

When the camera unit 2 is assembled, the lens assembly 1 shown in FIG. 1 is initially screwed and inserted into the camera main body frame 20 to stick and fix the lens assembly 1 to the camera main body frame 20. At this time, the adhesive agent is applied to the outer peripheral edge of the lens frame 10 and the front end part of the camera main body frame 20 to carry out a waterproof process so that water does not enter the camera unit. Further, the base board 210 on which the imaging element 21 such as a CCD solid state imaging element is mounted is stuck and fixed to the camera main body frame 20. The lens assembly 1 shown in FIG. 1 can be incorporated in the camera unit 2 by such a simple procedure.

In such a way, when the lens assembly 1 whose assembly is simplified can be simply incorporated in the camera unit 2, an assembling time for one camera unit can be shortened to reduce a production cost.

What is claimed is:

1. A lens assembly comprising:
   a lens frame having a hollow part into which a lens is inserted,
   wherein the lens frame has a bonding hole into which an adhesive agent is injected for bonding and fixing to the lens frame the lens inserted into the lens frame and which passes through an outer wall of the lens frame and an inner wall of the hollow part; and
   a space ring located along said hollow part of said lens frame, for receiving a peripheral edge of a lens surface which is different from the lens surface fixed by said adhesive agent.

2. The lens assembly according to claim 1, wherein the bonding hole has an opening opened on the outer wall, the opening in the outer wall having an area larger than that of an opening opened on the hollow part.

3. The lens assembly according to claim 1, wherein a plurality of bonding holes are provided in a direction of turning round the lens inserted into the lens frame.

4. The lens assembly according to claim 2, wherein a plurality of bonding holes are provided in a direction of turning round the lens inserted into the lens frame.

5. An imaging device comprising: a lens assembly according to claim 1; and an imaging element.

6. An imaging device comprising: a lens assembly according to claim 2; and an imaging element.

7. An imaging device comprising: a lens assembly according to claim 3; and an imaging element.

8. An imaging device comprising: a lens assembly according to claim 4; and an imaging element.

9. The lens assembly according to claim 1, further comprising additional space rings located along said hollow part of said lens frame, for receiving peripheral edges of lens surfaces of additional lenses inserted into said lens frame.

10. The lens assembly according to claim 9, wherein said space rings determine spaces between said lenses inserted into said lens frame.

11. The lens assembly according to claim 1, further comprising additional bonding holes located at outer peripheral surfaces of additional lenses inserted into said lens frame.

12. The lens assembly according to claim 1, wherein said space ring comprises a receiving part for receiving a convex surface of said lens and adjusting an eccentricity of said lens.

13. The lens assembly according to claim 9, wherein said space rings comprise receiving parts for receiving convex surfaces of said lenses inserted into said lens frame and adjusting eccentricities of said lenses inserted into said lens frame.

14. The lens assembly according to claim 1, wherein a backlash is formed between said hollow part of said lens frame and an outer peripheral surface of said lens so that a vibration applied to said lens frame adjusts an eccentricity of the optical axis of said lens.

15. The lens assembly according to claim 14, wherein said backlash is between 0.002 mm and 0.030 mm.

* * * * *